(12) United States Patent
Schmidt et al.

(10) Patent No.: US 6,172,498 B1
(45) Date of Patent: Jan. 9, 2001

(54) METHOD AND APPARATUS FOR ROTOR ANGLE DETECTION

(75) Inventors: Peter B. Schmidt, Franklin; Michael L. Gasperi, Racine; Thomas A. Nondahl, Wauwatosa, all of WI (US)

(73) Assignee: Rockwell Technologies, LLC, Thousand Oaks, CA (US)

( * ) Notice: Under 35 U.S.C. 154(b), the term of this patent shall be extended for 0 days.

(21) Appl. No.: 09/162,654

(22) Filed: Sep. 29, 1998

(51) Int. Cl.[7] .......................... G01B 7/00; G01R 33/025; H02K 23/00
(52) U.S. Cl. ................... 324/207.12; 324/207.25; 318/254
(58) Field of Search .............. 324/207.12, 207.25, 324/207.16, 225, 173; 318/254, 696, 701; 310/68 B

(56) References Cited

U.S. PATENT DOCUMENTS 5,569,990 * 10/1996 Dunfield .............................. 318/254

* cited by examiner

*Primary Examiner*—Walter Snow
(74) *Attorney, Agent, or Firm*—Michael A. Jaskolski; John J. Horn; William R. Walbrun

(57) ABSTRACT

A method and apparatus for determining the absolute position of a rotor in a permanent magnet synchronous machine (e.g. motor or generator) at standstill wherein short positive and negative voltage pulses are separately provided to each stator winding and the rate of current change with respect to time for each current is determined, the rates are used to determine general rotor position angle and thereafter are used to determine correction angle for correcting the general angle.

8 Claims, 5 Drawing Sheets

METHOD AND APPARATUS FOR ROTOR ANGLE DETECTION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to permanent magnet synchronous machines and more particularly to a method and apparatus for determining the absolute position of a motor rotor without use of position or velocity feedback transducers.

Many motion control applications which utilize a motor require motor rotor position information so that the motor and hardware linked thereto can be precisely regulated. For example, in a package handling system a motor rotor may be linked to a piston cylinder for moving a package laterally from a first position on a first conveyor to a second position on a second conveyor. To move the package from the first position to the second position the rotor may be required to rotate precisely 4.5 times in a clockwise direction. Thereafter, to park the piston out of the way of another package on the first conveyor the rotor may be required to rotate precisely 4.5 times in a counter-clockwise direction. In this case initial rotor position is important as well as rotor position during piston movement among the first and second positions. Even a small rotor position error may cause incorrect and unacceptable package alignment with the second conveyor resulting in system or package damage.

While the present example illustrates how rotor position is important prior to movement and during relatively slow rotor rotation, rotor position during fast rotor rotation is also important. For example, most motor driven industrial machines require some type of motor speed control. To this end, a speed feedback loop is typically provided so that motor speed can be regulated as a function of the difference between actual rotor speed (i.e. the feedback speed) and a reference or commanded speed.

Moreover, in virtually all control schemes involving permanent magnet synchronous motors rotor position is required to facilitate commutation. To facilitate precise motor control both a controller and some form of rotor position sensor are typically required. One common position sensor is an encoder. An encoder usually detects some known rotor nuance and uses the detected nuance to determine position. The nuance may include a plurality of magnets or light reflectors which are equi-spaced about a rotor end surface. In these cases the sensor would be a magnetic or light sensor, respectively, which detects the nuances and determines rotor position therefrom.

The encoder feeds the rotor position back to a motor controller via a hardwire feedback loop. In addition to a position sensor, some systems also utilize a velocity transducer to dynamically predict rotor position during the periods between encoder sampling times to more precisely identify rotor position.

Unfortunately, position and velocity sensors require additional system hardware and therefore increase both system procurement (e.g. parts) and manufacturing (e.g. assembly) costs. In addition, because sensors are subject to malfunction, sensor repair and system downtime prior to sensor repair can increase operating costs appreciably.

For these reasons the industry has exerted a great deal of effort developing sensorless rotor position identifying techniques. These techniques can generally be grouped into two different categories including techniques in a first category which rely on processing back electromotive force (bemf) signals and a second category including techniques which rely on identifying rotor magnetic saliency nuances.

With respect to the first category, these techniques generally track bemf caused by a rotating motor to identify rotor position. Unfortunately, bemf techniques have several shortcomings. For example, the bemf signal is sensitive to parameter variations at virtually all speeds. In addition, at standstill (i.e. zero rotor velocity) there is no bemf signal and therefore position cannot be determined using typical bemf methods.

With respect to the second category including systems which use magnetic rotor saliency to determine rotor position, many different schemes have been developed for identifying rotor position, each of which suffers from one or more shortcoming. For example, the publication entitled "Sensorless Position Control Of Permanent Magnetic Drives" by C. French et al., which was published in Proc. IEEE-IAS Annual Meeting, 1995, pp. 61–68 describes one system which uses a flux linkage based approach which requires three phase current and three phase voltage measurements. Having to measure three phase currents and three phase voltages is hardware intensive and therefore is relatively expensive and undesirable. In addition, with this scheme position resolution is decreased when speed is reduced.

Another solution which relies on m,magnetic saliency is described in U.S. Pat. No. 5,117,165 which is entitled "Closed-Loop Control Of a Brushless DC Motor From Standstill To Medium Speed", issued to Cassat et al. on May 26, 1992. This patent teaches a sensorless method to roughly estimate rotor position primarily for the purpose of starting a motor in the correct direction. To this end, this patent teaches providing separate positive and negative current pulses to each of several different stator windings, determining phase fluxes for each winding phase, determining the polarity of flux differences between each unique pair of fluxes and using the difference polarities to determine general rotor position within $\pi/m$ radians within one electrical period wherein m is the number or stator phases (i.e. windings).

While this solution is simple and relatively inexpensive and may be sufficiently accurate for some applications, this solution is clearly not accurate enough for other applications which require rotor position to be determined more precisely.

Therefore, it would be advantageous to have a method for determining rotor position of permanent magnet synchronous machines at standstill wherein the method is inexpensive, simple, accurate and relatively maintenance free.

BRIEF SUMMARY OF THE INVENTION

According to the present invention, to determine rotor position at standstill, a two step process is performed. First, a general rotor position angle a is estimated by providing separate positive and negative voltage pulses to each stator winding, determining a current rate change $\Delta I_w$ for each voltage pulse, identifying a maximum rate $\Delta I_{max}$ which is the rate $\Delta I_w$ which has the highest magnitude and selecting a general position angle α which is known to be similar to the actual rotor position when the identified rate is the maximum rate $\Delta I_{max}$.

Second, after general position angle a has been identified, rates $\Delta I_w$ are used to identify a correction angle θ which is added to the general position angle α to more precisely determine a rotor position angle Z (e.g. to within approximately 4% of actual position).

To this end, preferably, where the phase current which caused the maximum rate $\Delta I_{max}$ is positive, the rates $\Delta I_w$ associated with the other two positive phase currents (i.e. the two positive currents which did not cause the maximum rate $\Delta I_{max}$) are used to identify correction angle θ. Similarly, where the phase current which caused the maximum rate $\Delta I_{max}$ is negative, the two rates $\Delta I_w$ associated with the other two negative phase currents are used to identify correction angle θ. Hereinafter the two rates $\Delta I_w$ used to identify correction angle θ will be referred to as "precision rates".

More specifically, the precision rates are combined according to a specific form of a general equation, the specific form depending on which rate $\Delta I_w$ is the maximum rate $\Delta I_{max}$. The general equation is:

$$\theta \approx \kappa \cdot \frac{(x\Delta I_y - x\Delta I_z)}{(x\Delta I_y + x\Delta I_z)} \qquad \text{Eq. 1}$$

where k is a constant equal to cos(2π/3)/sin(2π/3), variable "x" corresponds to either "+" or "−" indicating that an associated rate was caused by a positive or a negative current, respectively, and each of subscripts "y" and "z" specifies a different one of the stator windings (i.e. A, B or C) corresponding to a specific precision rate.

For example, assume a three phase stator including windings A, B and C, where the maximum rate $\Delta I_{max}$ is caused by a positive current pulse in winding A. In this case, because the maximum rate $\Delta I_{max}$ is $\Delta I_A$ which is caused by a positive current pulse (i.e, x is positive), the precision rates are $\Delta I_B$ and $\Delta I_C$ and Equation 1 is written as:

$$\theta \approx \kappa \cdot \frac{(\Delta I_C - \Delta I_B)}{\Delta I_C + \Delta I_B} \qquad \text{Eq. 2}$$

Angle θ is either positive or negative, depending on the magnitudes of the precision rates. Angle θ tweaks general position angle α by either adding or subtracting a few degrees or radians. Specifically, for a three phase motor, four pole rotor, angle θ will modify general angle α by no more than 30 electrical degree (i.e. 15 mechanical degrees).

One object of the invention is to provide a method for determining rotor position without requiring a position sensor or other specialized hardware. To this end, current signals which are already typically sensed to facilitate motor control are used to determine rotor position using software.

Another object is to determine relatively precise rotor position. To this end, the present invention facilitates position estimation to within a few degrees of actual position rendering a system which includes the invention sufficiently accurate for most applications.

Another object of the invention is to accurately estimate rotor position simply so as to require minimal dedicated computing time. To this end, the invention takes advantage of simple calculations which require minimal computing time to determine rotor position. To this end, Equation 2 may be further simplified to θ≈K' ($\Delta I_C - \Delta I_B$) where $$K' = \frac{K}{\Delta I_C + I_B} \cdot K'$$

is a new constant because ($\Delta I_C + \Delta I_B$) is, for all practical purposes, a constant value.

Yet another object of the invention is to reduce system maintenance costs. Because the inventive position determiner does not require additional hardware maintenance costs are appreciably reduced over systems which require additional sensing hardware.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DETAILED DESCRIPTION OF THE INVENTION

I. Motor Configuration

Figure 1:
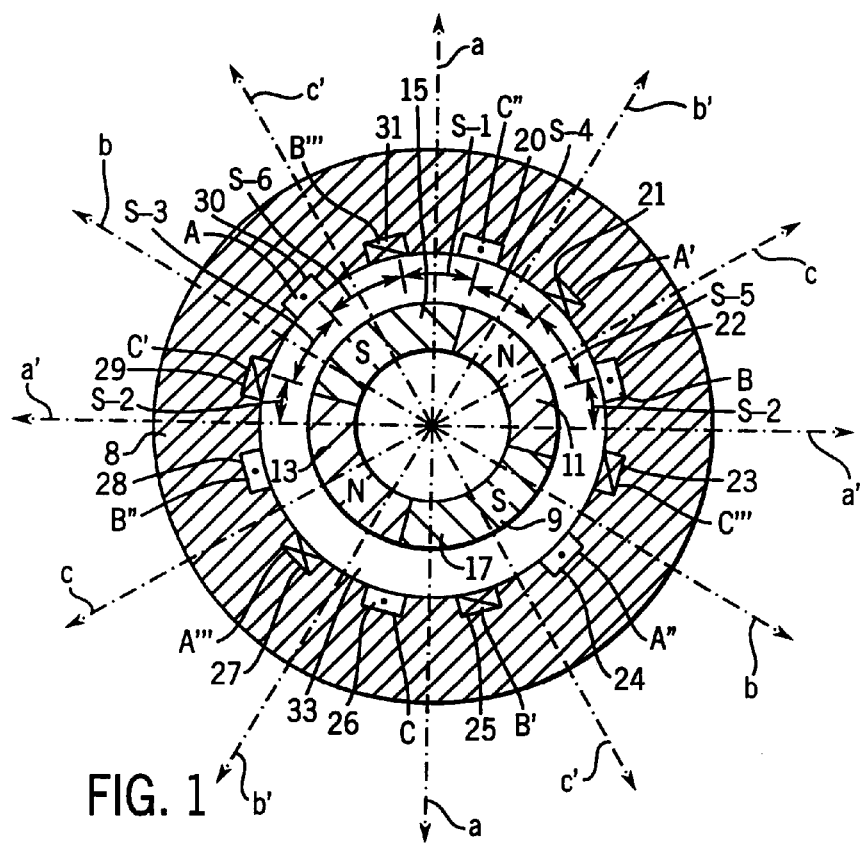
FIG. 1 is a cross-sectional view of an exemplary PM synchronous motor (PMSM)

The present invention will be described in the context of the exemplary PMSM 30 illustrated in FIG. 1. PMSM 30 includes a stator 8 and a rotor 9. Stator 8 includes an iron core and three windings A, B and C. Stator 8 forms a cylindrical cavity 33 defined by an internal surface 32. Twelve winding slots 20, 21, 22, 23, 24, 25, 26, 27, 28, 29, 30 and 31 are formed in surface 32. The slots 20–31 are equispaced about surface 32 and run the core 8 length (not illustrated).

Winding A is formed around an axis a—a and forms a continuous loop which passes at a first end (illustrated) of stator 8 from slot 30 (at A) into slot 21 (at A'), along the length of slot 21 to a second end (not illustrated) of stator 8 opposite the first end, from slot 21 into slot 24, along the length of slot 24 to the first end, from slot 24 (at A") at the first end into slot 27 (at A'''), along the length of slot 27 to the second end. One end of winding A is connected to the inverter and the other end is connected to the corresponding ends of phases B and C.

Winding B is formed around an axis b—b and forms a continuous loop which passes at the first end of stator 8 from slot 22 (at B) into slot 25 (at B'), along the length of slot 25 to a second end (not illustrated) of stator 8 opposite the first end, from slot 25 into slot 28, along the length of slot 28 to the first end, from slot 28 (at B") at the first end into slot 31 (at B'"), along the length of slot 31 to the second end and then from slot 31 again into slot 22 at the second end.

Winding C is formed around an axis c—c and forms a continuous loop which passes at the first end of stator 8 from slot 26 (at C) into slot 29 (at C'), along the length of slot 29 to a second end (not illustrated) of stator 8 opposite the first end, from slot 29 into slot 20, along the length of slot 20 to the first end, from slot 20 (at C") at the first end into slot 23 (at C'"), along the length of slot 23 to the second end and then from slot 23 again into slot 26 at the second end.

Axis a'—a', b'—b' and c'—c' are perpendicular to axis a—a, b—b and c—c, respectively. For the purposes of this explanation winding A is related to first and second axis a—a and a'—a', winding B is related to first and second axis b—b and b'—b' and winding C is related to first and second axis c—c and c'—c', respectively.

Rotor 9 is cylindrical and is mounted for rotation within cavity 33. Rotor 9 includes two oppositely facing north poles (i.e. permanent magnets) 11, 13 and two oppositely facing south poles 15, 17.

Referring also to FIG. 2a pulse width modulated (PWM) inverter 38 is illustrated which is linked to PMSM 30 for providing currents to windings A, B and C. In addition to being linked to PMSM 30, inverter 38 is shown connected to a signal generator 40 and a DC voltage source 42. Generator 40 is in turn linked to a controller 90.

Inverter 38 consists of six solid state switching devices 58, 59, 60, 61, 62 and 63 (BJT, GTO, IGBT or other transistor technology devices may be used) arranged in series pairs. Each device 58, 59, 60, 61, 62 and 63 is coupled with an inverse parallel connected diode 44, 45, 46, 47, 48 and 49, respectively. Each series arranged pair of switching devices 58 and 59, 60 and 61, and 62 and 63, make up a separate leg 66, 68 and 70 of inverter 38 and have a common node which is electrically connected to a unique motor terminal 72, 74 and 76 (and thus to a unique stator winding A, B or C). Each switching device 58 through 63 is also electrically connected by a firing line 51–56 to generator 40.

Source 42 is a split DC voltage source which creates a high voltage rail 78 and a low voltage rail 80 and each leg 66, 68 and 70 connects high voltage rail 78 to low voltage rail 80.

With respect to leg 66, generator 40 operates to turn devices 58 and 59 on and off in a repetitive sequence that alternately connects the high and low voltage rails 78 and 80 to, and produces a series of high frequency voltage pulses at, terminal 72. Similarly, generator 40 operates to turn devices 60 and 61 on and off in a repetitive sequence that alternately connects the high and low voltage rails 78 and 80 to, and produces a series of high frequency voltage pulses at, terminal 74 and operates to turn devices 62 and 63 on and off in a repetitive sequence that alternately connects the high and low voltage rails 78 and 80 to, and produces a series of high frequency voltage pulses at, terminal 76.

By controlling the current pulses provided to terminals 72, 74 and 76 electromagnetic fields within the stator cavity 33 are controlled such that the fields can be caused to rotate about cavity 33. As the stator fields rotate, the fields attract rotor north poles 11 and 13 and south poles 15 and 17 thereby causing rotor 9 to rotate within cavity 33.

Controller 90 provides command signals to generator 40 to drive PMSM 30 in a desired fashion. Controller 90 is linked via lines 91, 92 and 93 to current sensors 94, 95 and 96 (e.g. Hall effect sensors) which are in turn linked to feedlines for windings A, B and C. Sensors 94, 95 and 96 provide current feedback signals to controller 90 for general purpose motor control.

II. Theory

To appreciate the inventive method a number of general principles have to be understood. First, the direction of flux caused by current flowing through a winding depends on current polarity and can be determined according to application of the well known right hand rule. Thus, in FIG. 1, a positive current (as illustrated with a dot indicating incoming current and an "x" indicating outgoing current) in winding A causes north poles (i.e. radially outward flux) which are aligned with first axis a—a and south poles (i.e. radially inward flux) which are aligned with second axis a'—a' and a negative current in winding A causes south poles which are aligned with first axis a—a and north poles aligned with second axis a'—a'. Hereinafter flux caused by stator winding current is referred to generally as "stator current flux".

Second, rotor north poles 11 and 13 cause radially outward flux while south poles 15 and 17 cause radially inward flux. Hereinafter flux caused by rotor poles is referred to generally as "rotor flux".

Third, rotor flux and stator current flux combine to cause a total stator flux which generally increases when north poles align and decreases when north and south poles align.

Fourth, as total stator flux (i.e. combined rotor and stator current flux) increases, stator iron 8 (see FIG. 1) becomes relatively more saturated.

Fifth, as stator iron becomes more saturated, stator winding inductance decreases.

And sixth, when a voltage is applied across a stator winding, the current change rate $\Delta I_w$ is inversely proportional to winding inductance.

Relying on these principles general position angle α and correction angle θ can be determined.

A. General Position Angle α

Referring again to FIG. 1, rates $\Delta I_w$ are related to rotor 9 position with respect to windings A, B and C and therefore general position angle α can be estimated by providing current pulses to each of the three windings A, B and C, measuring current change rates $\Delta I_w$ for each pulse and then determining general position angle α based on the maximum rate $\Delta I_{max}$.

For example, to determine whether rotor north poles 11 and 13 are more closely aligned with first axis a—a or with second axis a'—a', first a positive voltage pulse is provided to winding A and a positive current rate $+\Delta I_A$ is measured and stored. After the positive current rate $+\Delta I_A$ has been stored, a negative voltage pulse having the same magnitude as the positive voltage pulse is provided to winding A and a negative current rate $-\Delta I_A$ is measured. Thereafter the positive current rate $+\Delta I_A$ is compared to the negative current rate $-\Delta I_A$ to determine general position angle α.

To this end, referring to FIG. 1, in a first situation referred to hereinafter as "case 1," where rotor north poles 11 and 13 are aligned with first axis a—a, when a positive voltage pulse is provided to winding A thereby causing radially outward stator current flux along axis a—a, the stator current and rotor flux align (i.e. are both radially outward) such that saturation of iron between slots 30 and 21 and between slots 24 and 27 increases causing winding A inductance to be low, a minimum, and therefore causing the positive current rate $+\Delta I_A$ to be high, a maximum.

However, in a second situation referred to hereinafter as "case 2," where rotor north poles 11 and 13 are aligned with second axis a'—a' so that south poles 15 and 17 are aligned with first axis a—a, when the positive voltage pulse is provided to winding A, stator current flux and rotor flux are misaligned (i.e. are in opposite directions) so that saturation of iron between slots 30 and 21 and between slots 24 and 27 is relatively lower than in case 1, causing winding A inductance to be relatively higher and causing the positive current rate $+\Delta I_A$ to be relatively lower.

On the other hand, where rotor north poles 11 and 13 are aligned with 10 first axis a—a, when a negative voltage pulse is provided to winding A thereby causing radially inward stator current flux along axis a—a, the stator current and rotor flux misalign (i.e. are in opposite directions) such that saturation of iron between slots 30 and 21 and between slots 24 and 27 is relatively low thereby causing winding A inductance to be relatively high and causing the negative current rate $-\Delta I_A$ to be relatively low.

Where rotor north poles 11 and 13 are aligned with second axis a'—a' so that south poles 15 and 17 are aligned with first axis a—a, when the negative current pulse is provided to winding A the stator current flux adds to the rotor flux so that saturation of iron between slots 30 and 21 and between slots 24 and 27 is relatively high causing winding A inductance to be relatively low and causing the negative current rate $-\Delta I_A$ to be relatively high.

In summary, when north poles 11 and 13 are aligned with first axis a—a the magnitude of the positive current rate $+\Delta I_A$ is greater than the magnitude of the negative current rate $-\Delta I_A$. Similarly, when the north poles 11 and 13 are aligned with second axis a'—a' the magnitude of the negative current rate $-\Delta I_A$ is greater than the magnitude of the positive current rate $+\Delta I_A$. When the north poles 11 and 13 are aligned with an axis between a—a and a'—a', magnitudes of the positive and negative current rates $+\Delta I_A$ and $-\Delta I_A$, respectively, are more similar (and are smaller than in case 1 or case 2).

The analysis above for positive and negative currents in winding A is also applicable to currents in windings B and C to determine with which of axis b—b, b'—b', c—c or c'—c' the north poles 11 and 13 are most closely aligned. For example, where positive and negative voltage pulses are provided to winding B, if the resulting magnitude of the positive current rate $+\Delta I_B$ is greater than the resulting magnitude of the negative current rate $-\Delta I_B$, then north poles 11 and 13 are more closely aligned with axis b—b. In the alternative, poles 11 and 13 are more closely aligned with axis b'—b'. Where positive and negative pulses are provided to winding C, if the resulting magnitude of the positive current rate $+\Delta I_C$ is greater than the resulting magnitude of the negative current rate $-\Delta I_C$, then north poles 11 and 13 are more closely aligned with axis c—c. In the alternative, poles 11 and 13 are more closely aligned with axis c'—c'.

Thus, to determine with which of axis a—a, a'—a', b—b, b'—b', c—c or c'—c' north poles 11 and 13 are most closely aligned, positive and negative voltage pulses are provided to each of windings A, B and C, rates $\Delta I_W$ are determined for each pulse, the maximum rate $\Delta I_w$ is identified and an associated axis a—a, a'—a', b—b, b'—b', c—c or c'—c' is identified as the general north pole position angle α from which rotor position is identified. For the purposes of this explanation, a zero radian angle will be arbitrarily assigned to axis a—a. When so assigned, axis a'—a' is at either ±π radians, axis b—b is at $-2\pi/3$ radians, axis c'—c' is at $-\pi/3$ radians, axis b'—b' is at $\pi/3$ radians and axis c—c is at $2\pi/3$ radians. Where the magnitude of winding A positive current rate $+\Delta I_A$ is greatest poles 11 and 13 are aligned most closely with axis a—a, where the magnitude of winding A negative current rate $-\Delta I_A$ is the greatest poles 11 and 13 are aligned most closely with axis a'—a', where the magnitude of winding B positive current rate $+\Delta I_B$ is greatest poles 11 and 13 are aligned most closely with axis b—b, where the magnitude of winding B negative current rate $-\Delta I_B$ is the greatest poles 11 and 13 are aligned most closely with axis b'—b', where the magnitude of winding C positive current rate $+\Delta I_C$ is greatest poles 11 and 13 are aligned most closely with axis c—c and where the magnitude of winding C negative current $-\Delta I_C$ is the greatest poles 11 and 13 are aligned most closely with axis c'—c'. The above rules are summarized in table 1:

TABLE 1

Rules for determining general position of rotor.

| Highest $\Delta I_W$ | General North Pole Axis | Angle α |
|---|---|---|
| $+\Delta I_A$ | a-a | 0 |
| $+\Delta I_B$ | b-b | $-2\pi/3$ |
| $+\Delta I_C$ | c-c | $2\pi/3$ |
| $-\Delta I_A$ | a'-a' | ±π |
| $-\Delta I_B$ | b'-b' | $\pi/3$ |
| $-\Delta I_C$ | c'-c' | $-\pi/3$ |

Figure 3:
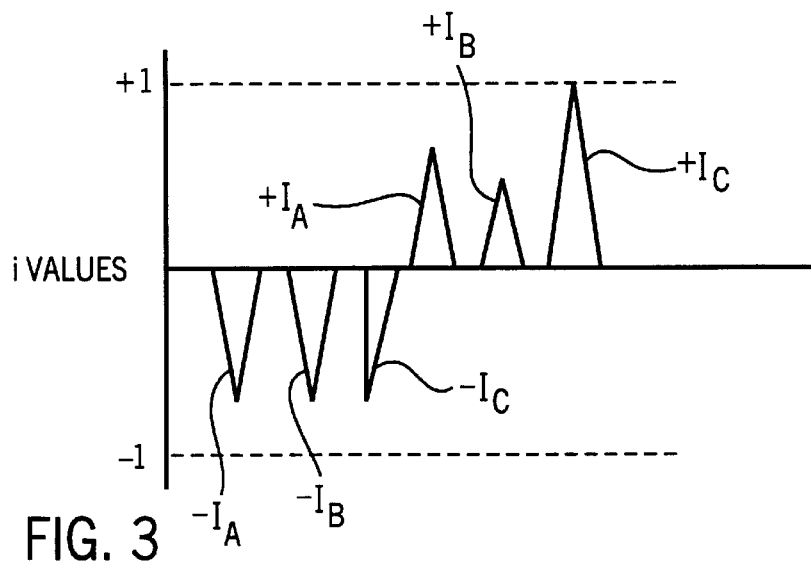
FIG. 3 is a graph illustrating peak current values for positive and negative current pulses generated in each stator phase for a given position in FIG. 1.

Referring to FIG. 3, the peak current values $+I_A$, $+I_B$, $+I_C$, $-I_A$, $-I_B$ and $-I_C$ at the rotor position in FIG. 1 for both positive and negative voltage pulses for each of windings A, B and C at zero rotor speed are illustrated. Peak values $+I_A$, $+I_B$, $+I_C$, $-I_A$, $-I_B$ and $-I_C$ were each generated via a voltage pulse of identical magnitude and duration and therefore peak values $+I_A$, $+I_B$, $+I_C$, $-I_A$, $-I_B$ and $-I_C$ are indicative of current change rates $\Delta I_W$ for each pulse. The peak current values are actually equal to a current rate change because the initial; point for all signals is zero. Therefore, $\Delta I_w = I_w - 0 = I_w$.

As expected, peak value $+I_C$ which corresponds to a positive current pulse in winding C, is the maximum peak value indicating maximum rate change. Examining FIG. 1, north pole pair 11–13 is most closely aligned with axis c—c. Therefore, prior to application of current to any of windings A, B or C, the iron between slots 20 and 23 and between slots 26 and 29 (i.e. iron adjacent axis c—c) is the most saturated. Flux between slots 20 and 23 and between slots 26 and 29 is radially outward (i.e. caused by north poles). Thus, when a positive current is provided to winding C generating a stator current flux which is radially outward along axis c—c the stator current flux and rotor north pole flux combine to highly saturate the iron between slots 20 and 23 and between slots 26 and 29. High saturation in turn causes low inductance in winding C and causes peak value $+I_C$ to be the maximum which indicates that the rate $+\Delta I_C$ is the maximum rate $\Delta I_{max}$.

Comparing peak value $+I_A$ to peak value $+I_C$, clearly value $+I_A$ is relatively lower. Referring again to FIG. 1, the flux in iron adjacent axis a—a is effected by all four poles 11, 13, 15 and 17 and therefore, even when combined with stator current flux, iron saturation between slots 30 and 21 and between slots 24 and 27 (i.e. adjacent axis a—a) is relatively small (i.e. south and north pole fluxes tend to negate each other). Because iron saturation between slots 30 and 21 and between slots 24 and 27 is relatively low, inductance is high and the resulting peak value +$I_A$ is relatively low. The same can be said for each of peak values −$I_A$, +$I_B$, −$I_C$ and −$I_B$.

Because north poles 11 and 13 are most closely aligned with axis c—c, according to Table 1, general position angle α is 2π/3 for the rotor as illustrated in FIG. 1.

B. Precise Rotor Position

After general position angle α has been determined, rates $\Delta I_W$ are further used to determine correction angle θ.

Referring again to FIGS. 1 and 3, pulses +$I_A$, +$I_B$, +$I_C$, −$I_A$, −$I_B$ and −$I_C$ represent peak winding current values when rotor 9 is in the position illustrated in FIG. 1. As rotor 9 position changes within cavity 33, peak values +$I_A$, +$I_B$, +$I_C$, −$I_A$, −$I_B$ and −$I_C$ vary as a function of north pole 11 and 13 positions. Just as the peak values vary, so too do the magnitudes of the current change rates. For example, if rotor 9 in FIG. 1 is rotated counter clockwise a few degrees such that north pole pairs 11 and 13 are precisely aligned with axis a—a and a positive current pulse passes through winding A, the radially outward flux from north poles 11 and 13 combines with the stator current flux along axis a—a to highly saturate iron between slots 30 and 21 and between slots 24 and 27 thereby decreasing winding A inductance resulting in a maximum peak current value +$I_A$ (not illustrated) and an associated maximum current rate change +$\Delta I_A$.

Figure 4:
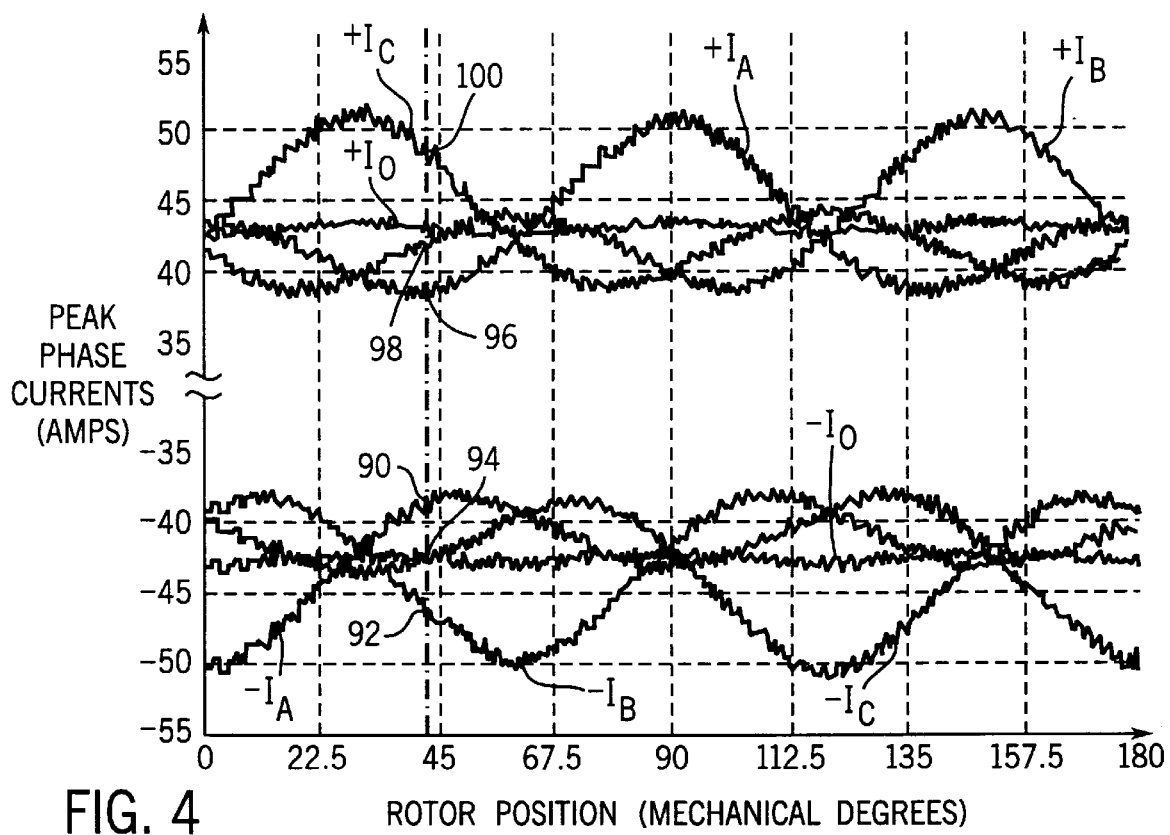
FIG. 4 is a graph illustrating current change rates for separate positive and negative current pulses for each stator phase for each possible rotor position of the rotor in FIG. 1.

Referring to FIG. 4, exemplary waveforms which indicate peak phase currents for each rotor position within a half rotor rotation (i.e. 180° mechanical) for each positive and each negative current pulse for each of the three windings A, B and C are illustrated. The peak values −$I_A$, −$I_B$, −$I_C$, +$I_A$, +$I_B$ and +$I_C$ of FIG. 3 correspond to points 90, 92, 94, 96, 98 and 100 in FIG. 4, respectively. Because peak values +$I_A$, +$I_B$, +$I_C$, −$I_A$, −$I_B$ and −$I_C$ in FIG. 4 are related to change rates +$\Delta I_A$, +$\Delta I_B$, +$\Delta I_C$, −$\Delta I_A$, −$\Delta I_B$ and −$\Delta I_C$, the waveforms in FIG. 4 are similar to corresponding initial current rate change waveforms +$\Delta I_A'$, +$\Delta I_B'$, +$\Delta I_C'$, −$\Delta I_A'$, −$\Delta I_B'$ and −$\Delta I_C'$, which are not illustrated.

As shown in FIG. 4, the average value of waveforms +$\Delta I_A'$, +$\Delta I_B'$, +$\Delta I_C'$ and the average value of waveforms −$\Delta I_A'$, −$\Delta I_B'$, −$\Delta I_C'$ are non-zero. In order to simplify the angle calculations, the change waveforms are normalized by solving the following equations to yield normalized waveforms +$\Delta I_A$, +$\Delta I_B$, +$\Delta I_C$, −$\Delta I_A$, −$\Delta I_B$ and, −$\Delta I_C$:

$$+\Delta I_A = +\Delta I_A' - (+\Delta I_0) \qquad \text{Eq. 3}$$

$$+\Delta I_B = +\Delta I_B' - (+\Delta I_0) \qquad \text{Eq. 4}$$

$$+\Delta I_C = +\Delta I_C' - (+\Delta I_0) \qquad \text{Eq. 5}$$

$$-\Delta I_A = -\Delta I_A' - (-\Delta I_0); \qquad \text{Eq. 6}$$

$$-\Delta I_B = -\Delta I_B' - (-\Delta I_0); \text{ and} \qquad \text{Eq. 7}$$

$$-\Delta I_C = -\Delta I_C' - (\times \Delta I_0). \qquad \text{Eq. 8}$$

Figure 5:
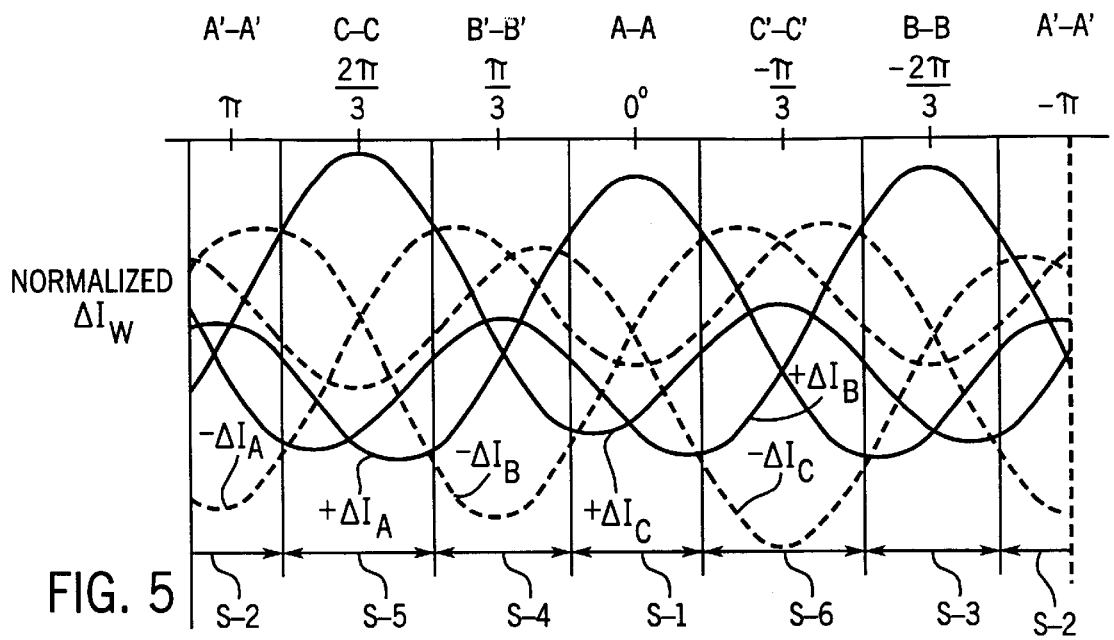
FIG. 5 is a graph illustrating the waveforms of FIG. 4 normalized.

Referring also to FIG. 5, exemplary initial rate waveforms have been corrected using Equations 3 through 8 and the results have been normalized.

Figure 6:
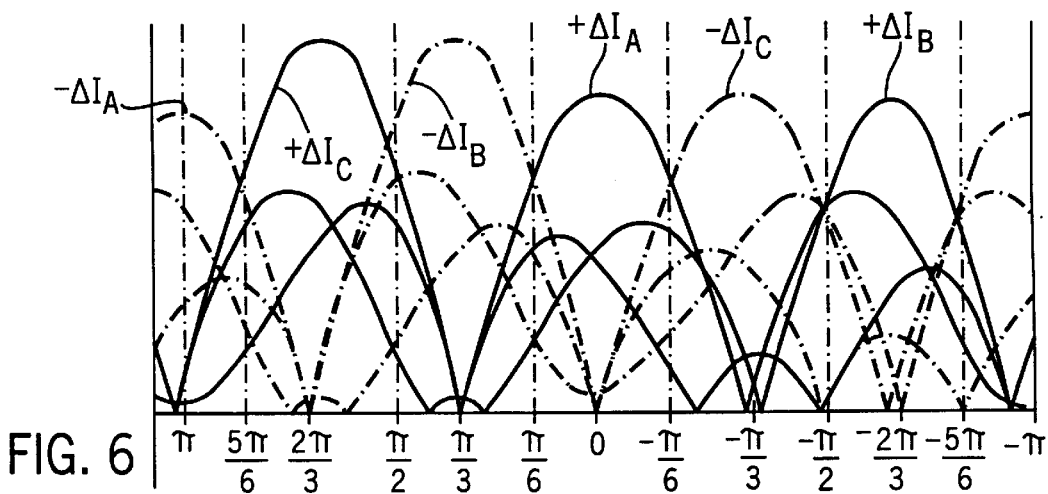
FIG. 6 is a is a graph illustrating the waveforms of FIG. 5 rectified.

Referring to FIG. 6 the waveforms of FIG. 5 have been rectified to illustrate maximum current rate changes at each rotor position. In keeping with the convention indicated above, rotor position when north poles 11 and 13 are precisely aligned with axis a—a is identified as the 0 radian position and axis c'—c', b—b and a'—a' are −π/3, −2n/3 and −π radians, respectively, in the counter-clockwise direction while axis b'—b' and c—c are π/3 and 2π/3 radians, respectively, in the clockwise direction. Thus, axis a—a, b—b, c—c, a'—a', b'—b'and c'—c' identify general positions to within π/3 radians, each axis centered on a different π/3 radian segment. In FIGS. 1 and 5 the segments are referenced as S-1, S-2, S-3, S4, S-5 and S-6. The axis are used as starting points from which more precise rotor position within associated segments S-1 through S-6 is determined.

As indicated above, the maximum rate $\Delta I_{max}$ (i.e. either +$\Delta I_A$, +$\Delta I_B$, +$\Delta I_C$, −$\Delta I_A$, −$\Delta I_B$ or −$\Delta I_C$) indicates which axis a—a, b—b, c—c, a'—a', b'—b', or c'—c' is most closely aligned with rotor north poles 11 and 13. Where the maximum rate $\Delta I_{max}$ is caused by a positive voltage pulse, the precision rates (i.e. the other two rates used to estimate correction angle θ) are other two rates which are caused by positive voltage pulses. Similarly, where the maximum rate $\Delta I_{max}$ is caused by a negative voltage pulse, the precision rates are the other two rates caused by negative voltage pulses. For example, if the maximum rate is +$\Delta I_A$, then rates +$\Delta I_B$ and +$\Delta I_C$ associated with windings B and C are used to determine correction angle θ.

To develop equations to estimate correction angle θ, the sinusoidal-like behavior of waveforms +$\Delta I_A$, +$\Delta I_B$ and +$\Delta I_C$ in FIG. 4 can be modeled as an average value $I_0$, plus some offset value $\Delta I_0$, as a function of mechanical rotor position θ such that:

$$I_A = I_0 + \Delta I_0 \cos(2\theta); \qquad \text{Eq. 9}$$

$$I_B = I_0 + \Delta I_0 \cos\left(2\theta + \frac{2\pi}{3}\right); \text{ and} \qquad \text{Eq. 10}$$

$$I_C = I_0 + \Delta I_0 \cos\left(2\theta - \frac{2\pi}{3}\right) \qquad \text{Eq. 11}$$

Subtract $I_0$ from both sides of each equation. Then Equation 10 can be divided by Equation 11 to yield the following equation:

$$\Delta I_B \cos\left(2\theta - \frac{2\pi}{3}\right) = \Delta I_C \cos\left(2\theta + \frac{2\pi}{3}\right) \qquad \text{Eq. 12}$$

where $\Delta I_B = I_B - I_0$ and $\Delta I_C = I_C - I_0$. Substituting well known trigonometric identities into Equation 12 and rearranging yields:

$$\frac{\sin(2\theta)}{\cos(2\theta)} = \frac{\cos\left(\frac{2\pi}{3}\right)}{\sin\left(\frac{2\pi}{3}\right)} \frac{(\Delta I_C - \Delta I_B)}{(\Delta I_C + \Delta I_B)} \qquad \text{Eq. 13}$$

A position approximation is made by recognizing that rotor position is generally known and therefore angle θ is relatively small and that cos(2θ)=1 and sin (2θ)=2θ for small angles. Estimated angle θ can then be expressed as:

$$\theta \approx \kappa \cdot \frac{(\Delta I_C - \Delta I_B)}{(\Delta I_C + \Delta I_B)} \qquad \text{Eq. 14}$$

where κ=cos(2π/3)/sin(2π/3) (i.e. +0.57735 radians).

Equation 14 can be made generic and plugged into an equation for finding actual rotor position angle Z yielding:

$$Z \approx \alpha + \kappa \cdot \frac{(x\Delta I_y - x\Delta I_z)}{(x\Delta I_y + x\Delta I_z)} \qquad \text{Eq. 15}$$

where x is the polarity (+ or −) of the current which caused maximum rate $\Delta I_{max}$ and:

when $\Delta I_A$ is $\Delta I_{max}$:
  y=C;
  z=B; and
  α32 0;
when $\Delta I_B$ is $\Delta I_{max}$:
  y=A;
  If x is positive, α=−2π/3; and
  If x is negative, α=π/3;
when $\Delta I_C$ is $\Delta I_{max}$:
  y=B;
  z=A;
  If x is positive, α=2π/3; and
  If x is negative, α=−π/3.

III. Implementation

Figure 10:
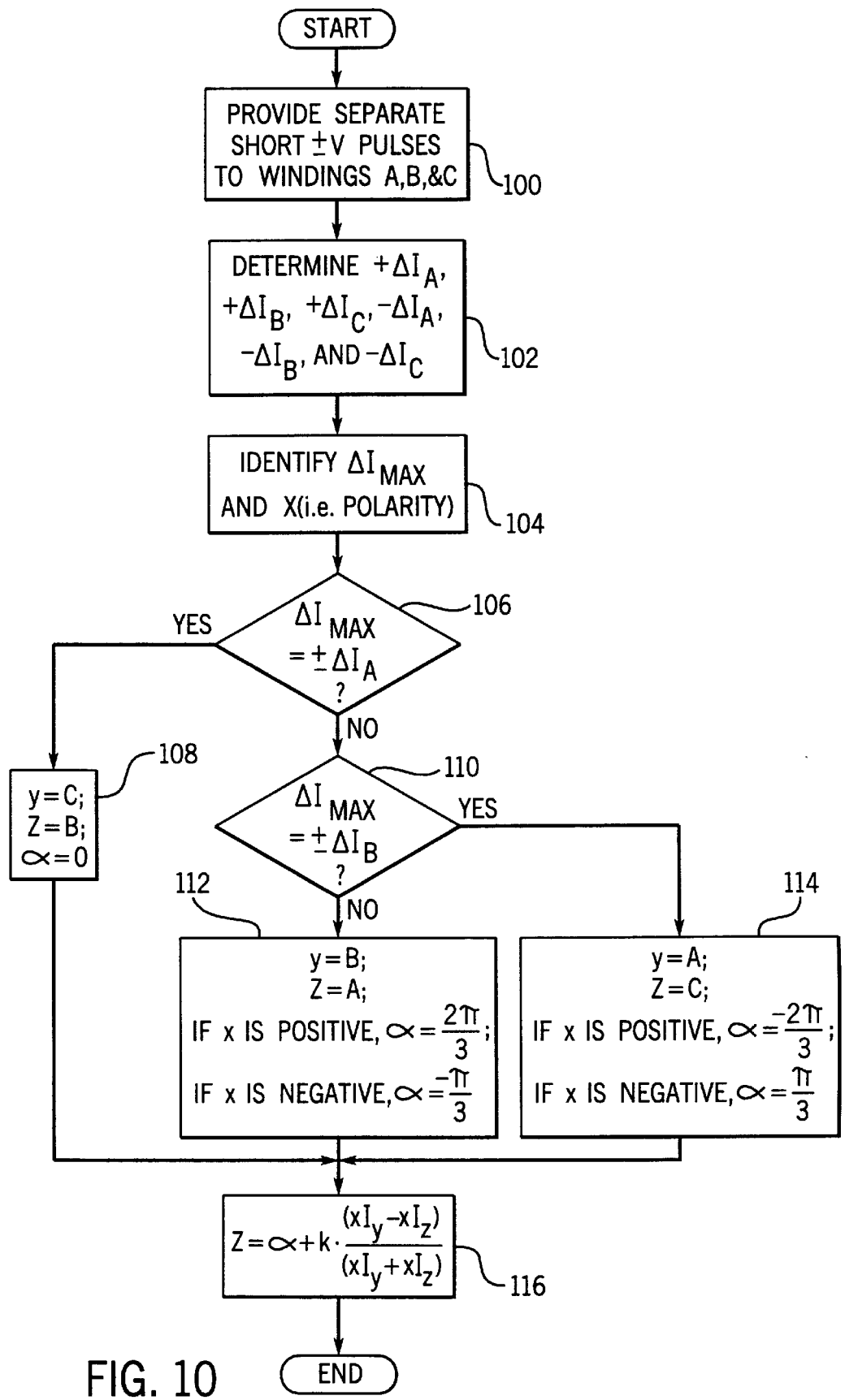
FIG. 10 is a flow chart illustrating the method of the present invention.

Referring now to FIG. 10, the inventive method for determining rotor position is illustrated. Referring also to FIG. 1, at process block 100 separate positive and negative voltage pulses are provided across each of stator windings A, B and C. To this end, referring also to FIG. 2, to provide a positive voltage pulse across winding A, devices 58, 61 and 63 are turned on linking terminal 72 to positive DC bus 78 and terminals 74 and 76 to negative DC bus 80. To provide a negative voltage pulse across winding A, devices 59, 60 and 62 are turned on linking terminals 74 and 76 to positive DC bus 78 and terminal 72 to negative DC bus 80. Positive and negative pulses are provided to windings B and C in a similar fashion. The voltage pulses cause currents in each of the stator windings, the rates of current change being required to determine rotor position.

Figure 8:
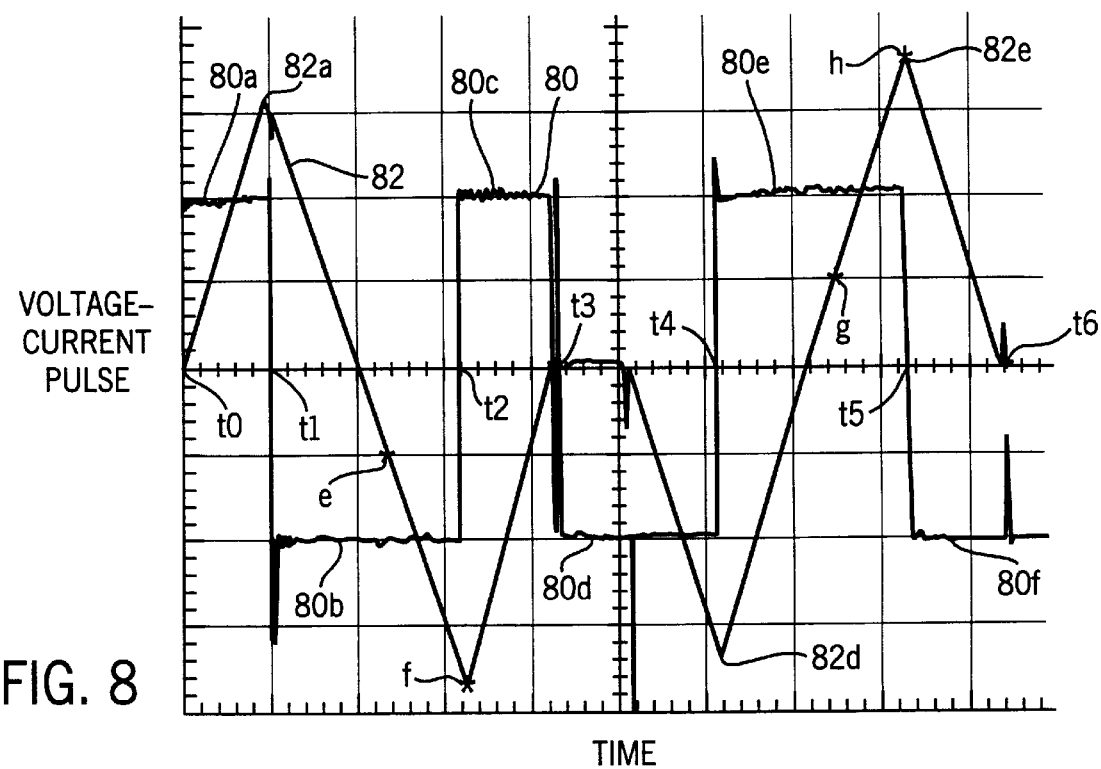
FIG. 8 is a graph illustrating a preferred exemplary voltage pulse sequence and a resulting current pulse train for a single phase.

Referring also to FIG. 8, a preferred exemplary sequence of positive and negative voltage pulses 80 and a resulting winding current pulse train 82 for a single winding are illustrated. It will be assumed that sequence 80 is provided for winding A. Sequence 80 includes three positive voltage pulses interleaved with three negative voltage pulses. Six pulses are preferred to minimize rotor torque while determining rotor angle. For example, to determine an initial negative current rate $-\Delta I_A'$, first, between times t0 and t1, positive pulse 80a is provided to winding A ramping current 82 up to point 82a. Then, between times t1 and t2, negative pulse 80b is provided ramping current 82 down to point 82b. Thereafter, between times t2 and t3, positive current pulse 80c is provided ramping current 82 back up to the zero level. In this manner, a negative current pulse is generated between times t1 and t2 for determining initial rate $-\Delta I_A'$ but the total current provided to winding A is essentially zero because the negative current pulse is preceded by an essentially identical positive current pulse.

Similarly, to determine an initial positive current rate $+\Delta I_A'$, first, between times t3 and t4, negative pulse 80d is provided ramping current 82 down to point 82d. Then, between times t4 and t5, positive pulse 80e is provided ramping current 82 up to point 82e. Thereafter, between times t5 and t6, negative current pulse 80f is provided ramping current 82 back down to the zero level. A positive current pulse is generated between times t4 and t5 for determining initial rate $+\Delta I_A'$ but the total current provided to winding A is essentially zero because the positive current pulse is preceded by an essentially identical negative current pulse.

Figure 9:
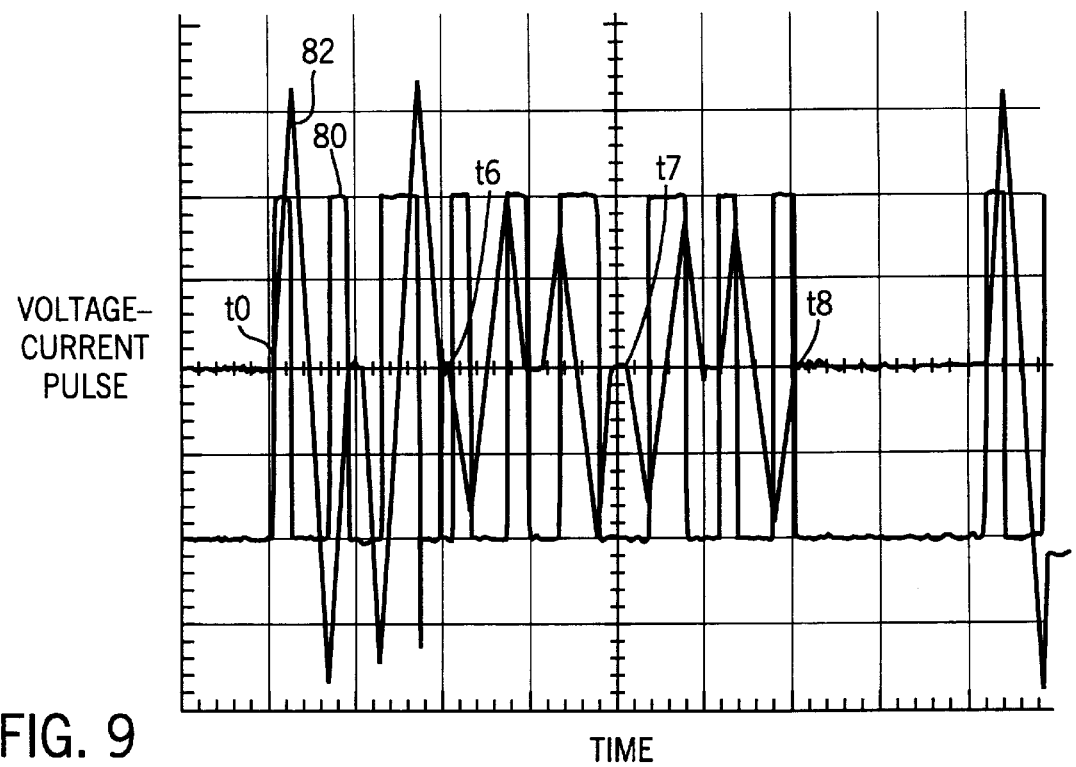
FIG. 9 is a graph similar to that illustrated in FIG. 8, albeit showing voltages and currents over a longer period.

Referring also to FIG. 9, sequence 80 and resulting pulse train 82 are illustrated for, in addition to the period between times t0 and t6 during which positive and negative pulse are provided to winding A, a second period between times t6 and t7 during which positive and negative pulses are provided to winding B and a third period between times t7 and t8 during which positive and negative pulses are provided to winding C. As can be seen, during the second and third periods pulse train 82 remains relatively lower than during the period between times t0 and t6. This is because, for example, during the second period (i.e. between times t6 and t7), current passing through winding B splits among windings A and C as the current returns to one of the DC buses (see FIG. 2).

Figure 2:
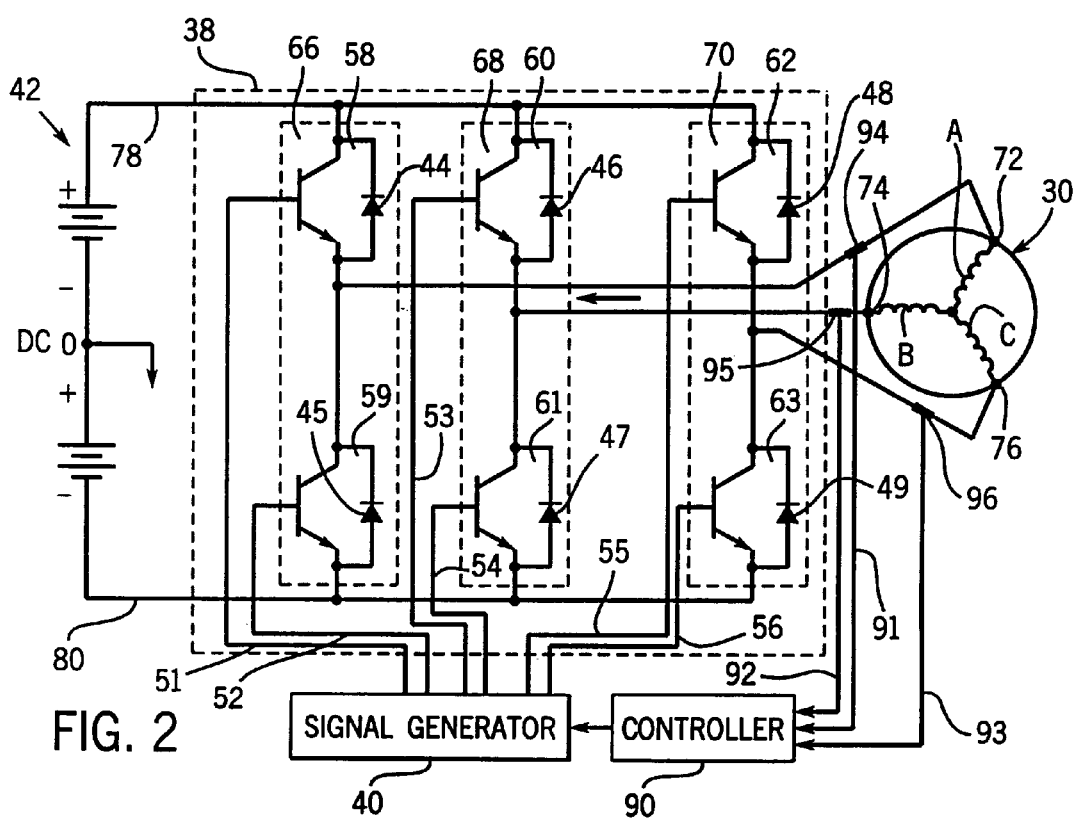
FIG. 2 is a schematic diagram of an inverter and control system linked to the motor of FIG. 1.

Referring to FIGS. 2 and 10, at block 102 controller 90 receives current feedback signals via sensors 94, 95 and 96 and determines rates $+\Delta I_A$, $+\Delta I_B$, $+\Delta I_C$, $-\Delta I_A$, $-\Delta I_B$ and $-\Delta I_C$. To this end, referring again to FIG. 8, controller 90 determines current levels at two distinct instances for each initial rate $+\Delta I_A'$, $-\Delta I_A'$, $+\Delta I_B'$, $-\Delta I_B'$, $+\Delta I_C'$ and $-\Delta I_C'$. For example, with respect to rates $+\Delta I_A'$ and $-\Delta I_A'$ controller 90 identifies two instances e and f during a negative pulse and two instances g and h during a positive pulse. Then, controller 90 determines initial rates $+I_A'$ and $-\Delta I_A'$ by subtraction. To determine initial rate $-\Delta I_A'$, controller 90 subtracts current e from current level f. Similarly, to determine initial rate $+\Delta I_A'$, controller 90 subtracts current level g from current level h. Next, controller 90 stores the absolute value of each of rates $+\Delta I_A'$ and $-\Delta I_A'$. Rates $+\Delta I_B'$, $-\Delta I_B'$, $+\Delta I_C'$ and $-\Delta I_C'$ are similarly determined and stored.

After each of initial rates $+\Delta I_A'$, $+\Delta I_B'$, $+\Delta I_C'$, $-\Delta I_A'$, $-\Delta I_B'$ and $-\Delta I_C'$ is stored, controller 90 determines the average positive and negative rates $+\Delta I_o$ and $-\Delta I_o$, respectively, by solving the following equations:

$$+\Delta I_o = \frac{((+\Delta I_A') + (+\Delta I_B') + (+\Delta I_C'))}{3} \qquad \text{Eq. 16}$$

$$-\Delta I_o = \frac{((-\Delta I_A') + (-\Delta I_B') + (-\Delta I_C'))}{3} \qquad \text{Eq. 17}$$

Next, controller 90 eliminates the DC offset associated with averages $+\Delta I_o$ and $-\Delta I_o$ by solving Equations 3 through 8 above yielding adjusted rates $+\Delta I_A$, $+\Delta I_B$, $+\Delta I_C$, $-\Delta I_A$, $-\Delta I_B$ and $-\Delta I_C$.

At process block 104 controller 90 determines which of rates $+\Delta I_A$, $+\Delta I_B$, $+\Delta I_C$, $-\Delta I_A$, $-\Delta I_B$ and $-\Delta I_C$ is the maximum rate $\Delta I_{max}$ and also determines the polarity x of rate $\Delta I_{max}$.

At decision block 106 controller 90 determines if $+\Delta I_A$ is the maximum rate $\Delta I_{max}$ and, if so, control passes to block 108. At block 108 controller 90 sets variables y=C, z=B and α=θ and thereafter control passes to block 116. If $+I_A$ A is not the maximum rate $\Delta I_{max}$ control passes to decision block 110.

At decision block 110 controller 90 determines if rate $+\Delta I_B$ is the maximum rate $\Delta I_{max}$ and, if so, control passes to block 114. At block 114 controller 90 sets variables y=A, z=C and, if x is positive, sets α=−2π/3 but if x is negative, sets α=π/3. Thereafter control passes to block 116. If $+\Delta I_B$ is not the maximum rate $\Delta I_{max}$ control passes to process block 112.

At block 112 controller 90 sets variables y=B, z=A and, if x is positive, sets α=π/3 but if x is negative, sets α=−π/3. Thereafter control passes to block 116.

At block 116 controller 90 solves Equation 15 to determine rotor position angle Z. The resulting angle Z is between plus and minus 180° or π radians from axis a—a (i.e. the arbitrary zero rotor position as illustrated on FIG. 1).

IV. Results

Figure 7:
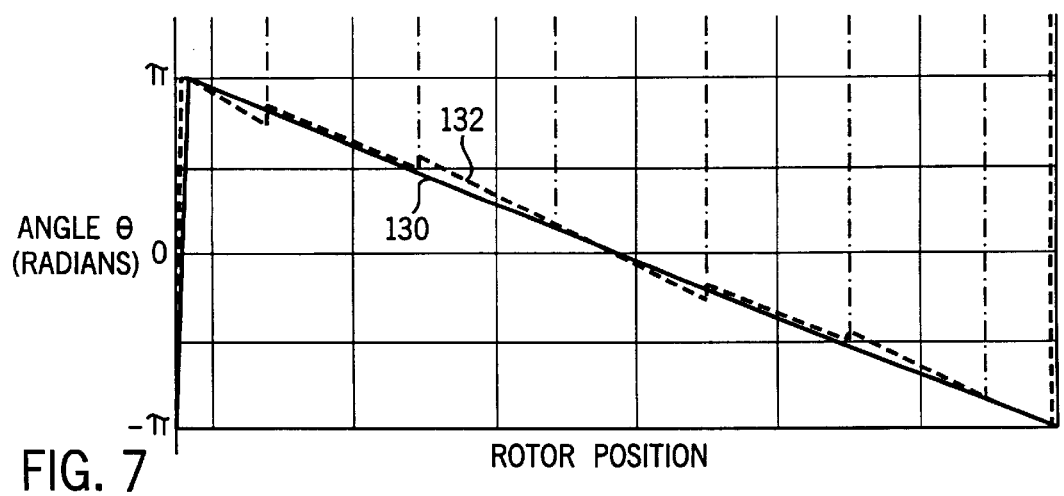
FIG. 7 is a graph illustrating actual rotor position and the rotor position as determined using the inventive method.

Referring to FIG. 7 actual rotor position 130 and estimated rotor position 132 as determined using the inventive method are illustrated. As can be seen the rotor position estimate derived using the inventive method is relatively accurate with only a cyclical recurring error. This cyclical error is due to the small angle approximation which is used to simplify calculations required to determine the rotor position angle Z and is proportional to the number of regions into which the angular area of cavity 33 is divided. These regions are a function of the number of rotor and stator poles and phases.

It should be understood that the methods and apparatuses described above are only exemplary and do not limit the scope of the invention, and that various modifications could be made by those skilled in the art that would fall under the scope of the invention. For example, while initial general rotor position is determined above by determining which of the current rates is a maximum rate, clearly the initial position could be determined by recognizing some other relationship between rates and rotor position. For example, the minimum rate should be perpendicular to the maximum rate and therefore the minimum rate could be used to determine initial position.

In addition, while Equation 15 has been derived to accurately estimate rotor position from two precision rates where the precision rates are the rates associated with currents which are the same polarity as the maximum rate, clearly other equations could be developed which mathematically combine another combination of two rates or more than two rates to determine position. For example, where the maximum rate is positive, an equation could be derived which uses two negative rates to determine precise rotor position.

Moreover, while the small angle theorem was used above to simplify calculations required to implement the inventive method, the actual rotor position could be found by calculating the inverse tangent and dividing the remaining angle by 2.

Furthermore, while the invention is described in the context of a three phase motor, clearly the invention could be used with other motor designs including less or fewer phases. Moreover, any stator having equispaced slots numbering 12N where N is an integer, may be used to practice the present invention and other configurations may also be possible.

To apprise the public of the scope of this invention, we make the following claims:

We claim:

1. A method for use with a PMSM motor having a rotor which includes at least one north pole and at least one south pole, the method for determining the absolute position of one north pole, the motor also including a stator having a core and Q phase windings arranged about the core, each winding associated with first and second perpendicular axis and arranged such that when a positive current passes through the winding, the current generates radially outward flux along the first axis and radially inward flux along the second axis and when a negative current is provided to the winding, the current causes radially inward flux along the first axis and radially outward flux along the second axis, the method comprising the steps of:

(a) separately applying short duration positive and negative voltage pulses of equal magnitude to each of the stator windings;

(b) determining a current change rate for each pulse;

(c) using the change rates to determine a general angle indicating the general rotor position;

(d) mathematically combining at least two of the change rates to determine a correction angle; and (e) mathematically combining the correction angle and the general angle to determine a precise rotor position.

2. The method of claim 1 wherein the step of using the change rates to determine a general angle includes the steps of, identifying the maximum change rate, identifying the current which caused the maximum change rate as a general position current and the winding through which the general position current passes as the general position winding, when the general position current is positive, selecting the first axis associated with the general position winding as the general location of the north pole and, when the position current is negative, selecting the second axis associated with the general position winding as the general location of the north pole.

3. The method of claim 2 wherein rates caused by positive voltage pulses are positive rates and rates caused by negative voltage pulses are negative rates and further including the steps of, after determining a rate for each pulse, (i) determining an average positive rate by mathematically combining the positive rates and determining an average negative rate by mathematically combining the negative rates, (ii) modifying each positive rate by subtracting the average positive rate from each positive rate and taking the absolute value of the difference and (iii) modifying each negative rate by subtracting the average negative rate from each negative rate and taking the absolute value of the difference and wherein the step of identifying the maximum change rate includes identifying the modified rate having the maximum magnitude and the step of mathematically combining to determine the general position angle includes combining two of the modified currents.

4. The method of claim 1 wherein there is a maximum change rate and other change rates and the step of mathematically combining to determine a correction angle includes combining at least two of the other change rates.

5. The method of claim 4 wherein the polarity of the current which causes the maximum change rate is a general position polarity and the step of mathematically combining to determine a correction angle includes combining the other rates which are caused by currents having the general position polarity.

6. The method of claim 5 wherein Q is 3, there are three stator windings A, B and C and step of mathematically combining to determine the correction angle includes the step of solving the following equation:

$$\theta \approx \kappa \frac{(x\Delta I_y - x\Delta I_z)}{(x\Delta I_y + x\Delta I_z)}$$

where x is the general position polarity, $+\Delta I_A$, $+\Delta I_B$, $+\Delta I_C$, $-\Delta I_A$, $-\Delta I_B$ and $-\Delta I_C$ are the current rate changes corresponding to each current pulse and k is a constant equal to $\cos(2\pi/3)/\sin(2\pi/3)$, and where, when either $+\Delta I_A$ or $-\Delta I_A$ is the maximum rate, y=C and z=B, when either $+\Delta I_B$ or $-\Delta I_B$ is the maximum rate, y=and z=C and when either $+\Delta I_C$ or $-\Delta I_C$ is the maximum rate, y=B and z=A.

7. The method of claim 6 wherein, when either $+\Delta I_A$ or $-\Delta I_A$ is the maximum rate, the general position angle is zero or $\pm\pi$ radians respectively, when $+\Delta I_B$ is the maximum rate the general position angle is $-2\pi/3$, when $-\Delta I_B$ is the maximum rate, the general position angle is $\pi/3$, when $+\Delta I_C$ is the maximum rate the general position angle is $2\pi/3$, when $-\Delta I_C$ is the maximum rate, the general position angle is $-\pi/3$.

8. The method of claim 1 wherein each positive pulse is between two negative pulses and each negative pulse is between two positive pulses.

* * * * *